US012242009B2

(12) United States Patent
Kazei et al.

(10) Patent No.: US 12,242,009 B2
(45) Date of Patent: Mar. 4, 2025

(54) METHOD AND SYSTEM FOR MEASURING STRAIN RATE AT A SCALE SHORTER THAN GAUGE LENGTH

(71) Applicant: ARAMCO SERVICES COMPANY, Houston, TX (US)

(72) Inventors: Vladimir Kazei, Houston, TX (US); Konstantin Osypov, Houston, TX (US); Harold Merry, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 272 days.

(21) Appl. No.: 18/063,010

(22) Filed: Dec. 7, 2022

(65) Prior Publication Data
US 2024/0192396 A1 Jun. 13, 2024

(51) Int. Cl.
*G01H 9/00* (2006.01)
*G01V 1/22* (2006.01)
*G01V 1/42* (2006.01)

(52) U.S. Cl.
CPC ............. *G01V 1/42* (2013.01); *G01H 9/006* (2013.01); *G01V 1/226* (2013.01); *G01V 2210/121* (2013.01); *G01V 2210/1429* (2013.01)

(58) Field of Classification Search
CPC .... G01V 1/42; G01V 1/226; G01V 2210/121; G01V 2210/1429; G01H 9/006
See application file for complete search history.

(56) References Cited

U.S. PATENT DOCUMENTS 10,151,626 B2  12/2018  Godfrey et al.
10,287,874 B2   5/2019  Jin et al.
(Continued)

FOREIGN PATENT DOCUMENTS

WO   WO-2013093460 A2 *  6/2013  ............. G01H 9/004
WO   2020/242448 A1     12/2020

OTHER PUBLICATIONS

A. Constantinou et al., Comparison of Fiber-optic Sensor and Borehole Seismometer VSP Surveys in a Scientific Borehole: Dfdp-2B, Alpine Fault, New Zealand, SEG International Exposition and Annual Meeting 2016: SEG-2016-13946302, Oct. 16, 2016 (5 pages).
(Continued)

*Primary Examiner* — Krystine E Breier
(74) *Attorney, Agent, or Firm* — Osha Bergman Watanabe & Burton LLP

(57) ABSTRACT

A method and system for measuring strain rate at a scale shorter than gauge length are disclosed. The method includes deploying a plurality of discrete seismic receivers and a distributed acoustic system (DAS) in a borehole extending into a formation. The method further includes obtaining a first DAS measurement (DAS1) between a first position and a second position, obtaining a second DAS measurement (DAS2) between a third position and a fourth position, and obtaining a discrete seismic receiver measurement between the second position and the fourth position. The method further includes determining an DAS equivalent discrete measurement (DASeq) from the discrete seismic receiver measurement, determining a sub-gauge DAS measurement (DASsg) based, at least in part, on the first DAS measurement, the second DAS measurement and the DAS equivalent discrete measurement, and determining mechani-
(Continued)

cal characteristics of the formation based, at least in part, on the sub-gauge DAS measurement.

20 Claims, 7 Drawing Sheets

(56) References Cited

U.S. PATENT DOCUMENTS

2019/0120047 A1    4/2019   Jin et al.
2019/0331819 A1   10/2019   Wu et al.
2020/0018149 A1    1/2020   Luo et al.

OTHER PUBLICATIONS

Office Action issued by Saudi Arabian patent office for corresonding Saudi Arabian patent application No. SA 123450992, mailed Nov. 7, 2024 (6 pages).

\* cited by examiner

METHOD AND SYSTEM FOR MEASURING STRAIN RATE AT A SCALE SHORTER THAN GAUGE LENGTH

BACKGROUND

Gauge Length (GL) is a parameter of a Distributed Acoustic Sensing (DAS) system that determines length of a fiber segment over which a strain is averaged during a DAS system measurement. In contrast to geophones, that measure particle velocity at a point, DAS measures strain or strain rate averaged over the GL. The size of the GL essentially defines the resolution of a DAS system. Generally, a longer GL improves signal-to-noise ratio (SNR) in the data but reduces resolution of a DAS system. For most of the current commercially available systems, GL varies in a range of 2-20 meters (m). GL is the primary parameter impacting the resolution of a single recording channel of a DAS system, with shorter GL usually result in low SNR. In addition, many DAS systems adopt GL length that is multiple times of an allowable base length and, thus, result in notches in the spatial spectrum of data without allowing base GL reconstruction.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes deploying a plurality of discrete seismic receivers and a distributed acoustic system (DAS) in a borehole extending into a formation. The method further includes obtaining a first DAS measurement (DAS1) between a first position and a second position, obtaining a second DAS measurement (DAS2) between a third position and a fourth position, and obtaining a discrete seismic receiver measurement between the second position and the fourth position. The method further includes determining an DAS equivalent discrete measurement (DASeq) from the discrete seismic receiver measurement, determining a sub-gauge DAS measurement (DASsg) based, at least in part, on the first DAS measurement, the second DAS measurement and the DAS equivalent discrete measurement; and determining mechanical characteristics of the formation based, at least in part, on the sub-gauge DAS measurement In general, in one aspect, the embodiments relate to a system, wherein the system includes a plurality of discrete seismic receivers and a distributed acoustic system (DAS) deployed in a borehole extending into a formation. The system further includes a seismic processor configured to: obtain a first DAS measurement (DAS1) between a first position and a second position, obtain a second DAS measurement (DAS2) between a third position and a fourth position, and obtain a discrete seismic receiver measurement between the second position and the fourth position. The seismic processor is further configured to determine an DAS equivalent discrete measurement (DASeq) from the discrete seismic receiver measurement, determine a sub-gauge DAS measurement (DASsg) based, at least in part, on the first DAS measurement, the second DAS measurement and the DAS equivalent discrete measurement, and determine mechanical characteristics of the formation based, at least in part, on the sub-gauge DAS measurement.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
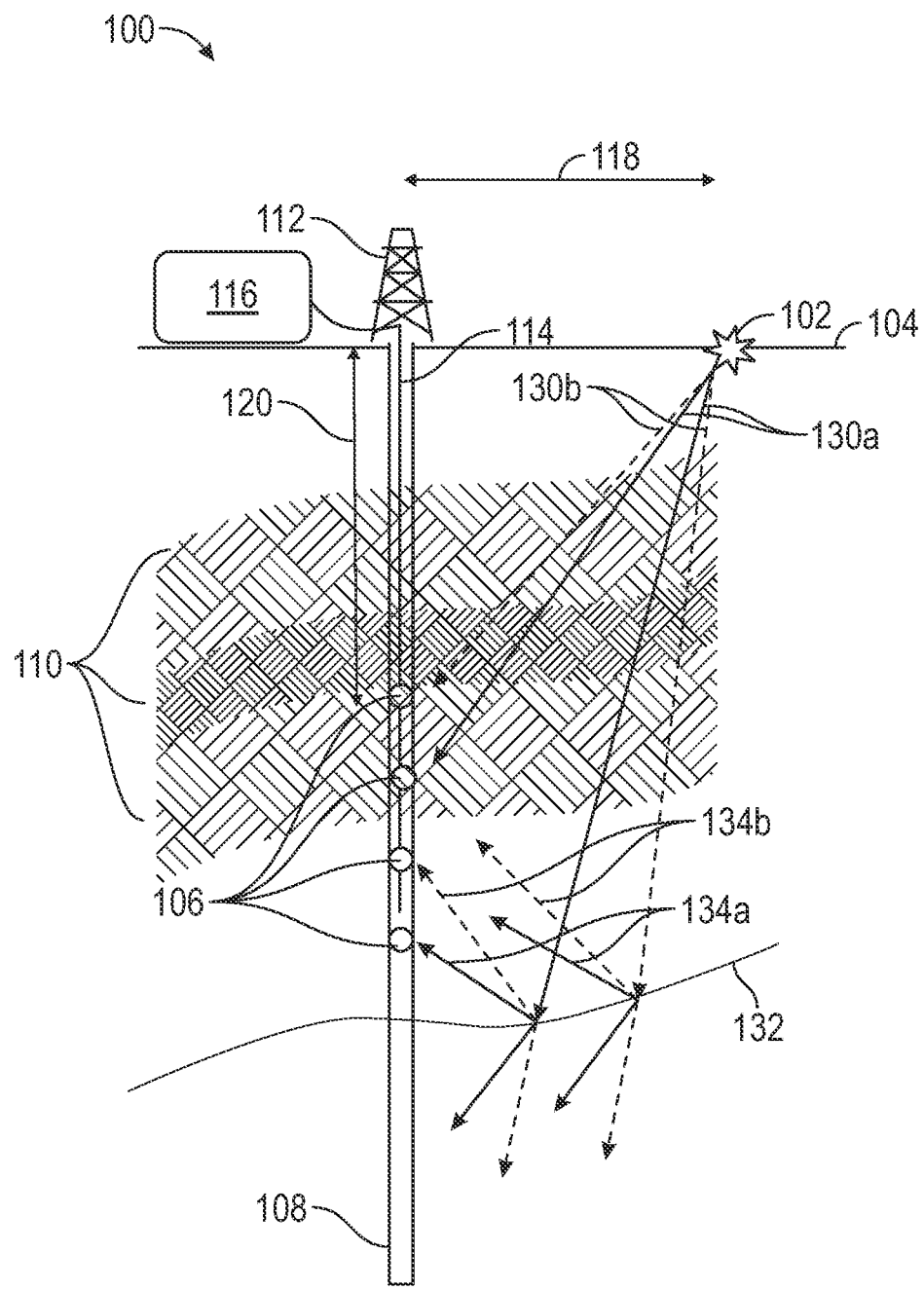
FIG. 1 shows a DAS system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of "equal" throughout the application is not limited to exactly equal, it may refer "exactly equal" or "more or less equal," depending on the context.

Embodiments are disclosed herein for obtaining a plurality of Distributed Acoustic Sensing (DAS). Further, embodiments are disclosed for obtaining a plurality of discrete seismic receiver measurements by a plurality of discrete seismic receivers. Embodiments are disclosed for determining an DAS equivalent measurement from the plurality of discrete seismic receiver measurements. Further, embodiments are disclosed for using the plurality of DAS measurements and the DAS equivalent discrete measurement to determine a sub-gauge DAS measurement.

The discrete seismic receivers are, in some embodiments, sensors located on land that acquire seismic data or seismic signals. More details of the discrete seismic receivers are described below with reference to FIGS. 1-2.

DAS is fiber optic-based technology that utilizes Rayleigh scattering to detect acoustic or vibration signals in a certain range. DAS enables continuous and real-time measurement along the entire length of a fiber optic cable, regardless of long distance and harsh environment. For example, DAS may be used to record fluid and gas flow signals and/or hydraulic fracturing-related signals in various operations in oil and gas wells. With the real-time and good quality measurement from DAS, engineers and geologists are able to make optimized decisions onsite. In DAS, fiber optic cables are used as sensors along the length of the fiber optic cable. An optical pulse launcher (404) connected to the end of a distributed fiber sensor which uses a laser to send pulses of light along a fiber. Some proportion of the light travelling along the fiber is reflected back and interferes with the other proportion of the travelling light by the process of Rayleigh scatter. This interference is observed by a DAS interrogator and is recorded by a data acquisition system (404). This data may be further analyzed to determine event type. More details of the DAS system are described in FIGS. 3-4.

In general, embodiments of the disclosure include a system and a method for determining a sub-gauge DAS measurement. More specifically, in accordance with one or more embodiments, the method may deploy a plurality of discrete seismic receivers and a DAS system in a borehole extending into a formation. Further, in accordance with one or more embodiments, the method may obtain a plurality of DAS measurements between different positions and a discrete seismic receiver measurement at one of the different positions based on the deployment. Moreover, in accordance to one or more embodiments, the method may determine an DAS equivalent discrete measurement and further determine the sub-gauge DAS measurement based on the plurality of DAS measurements and the DAS equivalent discrete measurement.

Both measurements by the DAS and the discrete seismic receivers are techniques for acquiring vertical seismic profile (VSP) surveys. VSPs are frequently acquired in wellbores penetrating hydrocarbon reservoirs by engineers and geoscientists in the oil and gas industry. VSPs are used to characterize and image reservoir structure in the vicinity of the wellbore and to convert surface seismic data acquired over the reservoirs from seismic recording time to depth below the surface.

FIG. 1 depicts a VSP recording geometry (100) of a borehole seismic survey using a plurality of discrete seismic receivers in accordance with one or more embodiments. Unlike surface seismic datasets, which are acquired using a plurality of seismic sources and seismic receivers located on the earth's surface, the borehole seismic survey typically has one or more seismic source (102) on the surface (104) and a plurality of seismic receivers (106) located in a wellbore (108) that may penetrate a plurality of geological layers (110) in the subsurface region of interest. The plurality of seismic receivers (106) may be suspended from a derrick (112) or a crane (not shown) using a means of conveyance (114). The means of conveyance may be a wireline cable, fiber optic cable, coil tubing, drill pipe, wired drill pipe, or any other conveyance mechanism as would be understood by one of ordinary skill in the art. In addition to providing mechanical support to the plurality of seismic receivers (106) in the wellbore (108), the means of conveyance (114) may provide electrical power to the plurality of seismic receivers (106) or transmit data recorded by the plurality of seismic receivers (106) to a recording facility (116) on the surface (104), or both provide power and transmit data. In operation on land, the recording facility (116) may be mounted in a truck or other vehicle or structure. In operation at sea, the recording facility (116) may be part of a drilling rig, production platform, or ship (not shown). When the plurality of seismic receivers (106) are deployed into the wellbore, the length of cable unspooled may be monitored, thus the depth of each of the seismic receivers (106) may be known at any time with a high level of certainty. In particular, the depth of each of the seismic receivers (106) may be known at the time at which a VSP dataset is recorded with a high level of certainty. Frequently, seismic sources may be located at a distance (118) from the derrick (112) or crane and the seismic receivers may be located at a depth (120). Often, the depth (120) is much greater than the distance (118) but this may not always be the case.

When the seismic source (102) is excited, seismic waves (130a, 130b) radiate from the seismic source (102) and may propagate from the seismic source (102) directly to the plurality of seismic receivers (106) where they are recorded. In addition, seismic waves may be reflected from geological discontinuities (132) and these reflected seismic waves (134a, 134b) may be recorded by the plurality of seismic receivers (106). Some of the seismic waves radiating away from the seismic source may be P-waves (130a) and others may be S-waves (130b). Similarly, some of the seismic waves reflected from a geological discontinuity (132) may be P-waves (134a) and others may be S-waves (134b). Seismic P-waves (130a) incident on the geological discontinuity (132) may be reflected as P-waves (134a) or may be reflected as S-waves (134b). Similarly, seismic S-waves (130b) incident on the geological discontinuity (132) may be reflected as P-waves (134a) or may be reflected as S-waves (134b).

Each seismic receiver (106) detects and records the vibrations caused by seismic waves as a time series or "trace". Each sample of the trace records the amplitude of the vibration caused by seismic waves at the time the sample is taken. The amplitudes may have positive or negative values at different times along the trace. A multicomponent seismic receiver records one trace for each component. Thus, a three-component seismic receiver will produce three traces each measuring displacement in a mutually perpendicular direction.

Figure 2:
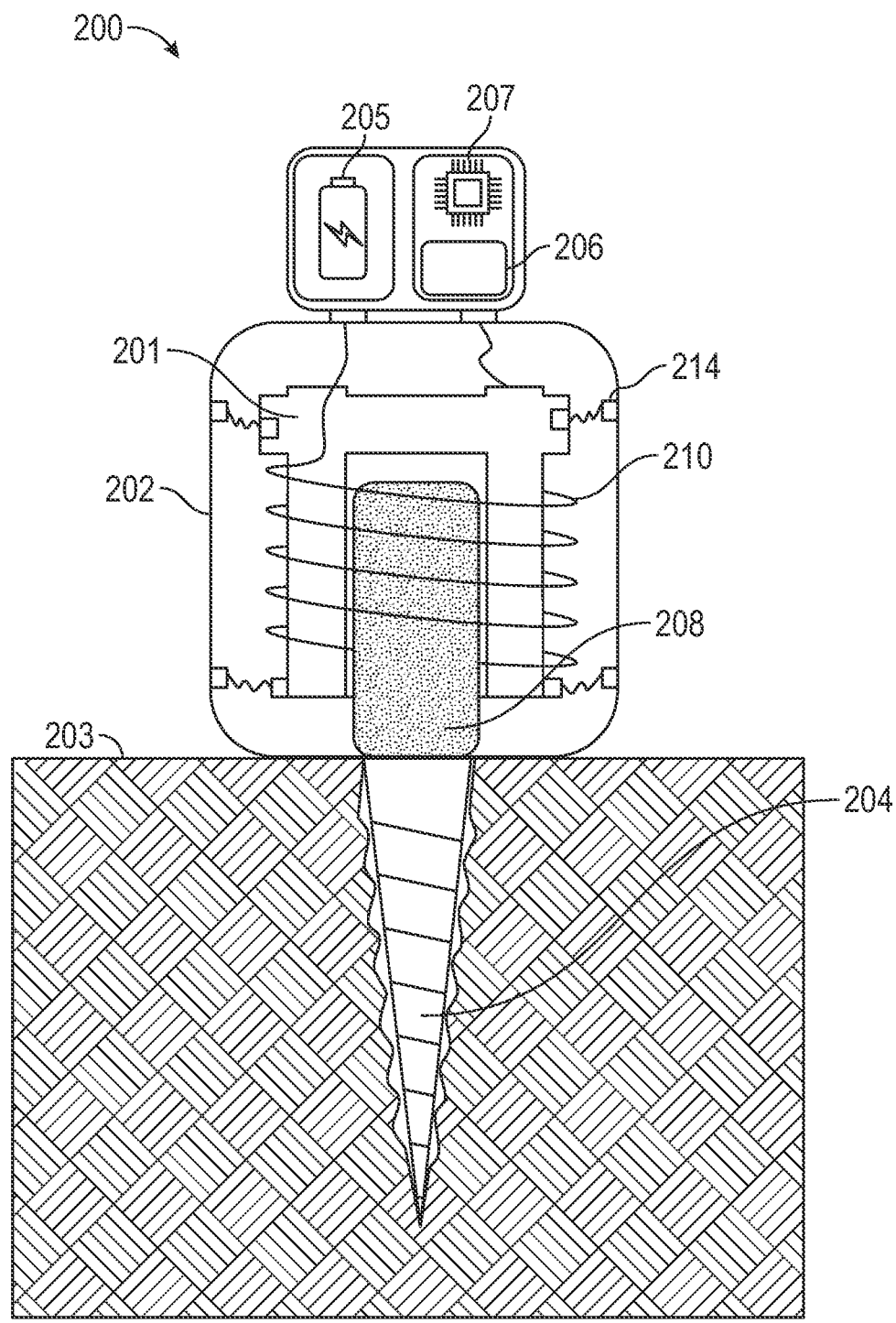
FIG. 2 shows a seismic receiver example of a geophone in accordance with one or more embodiments.

In accordance with one or more embodiments, a seismic receiver may be a geophone (200) as shown in FIG. 2. In other embodiments a seismic receiver may be a geophone, accelerometer, hydrophone, or a strain meter individually or in combination. The sensor may be housed in a sensor casing (202) that may have an arbitrary shape such as spherical, cylindrical, pyramidal or cubic. The seismic receiver may be coupled to the ground surface (203) through a variety of coupling mechanisms such as a threaded ground spike (204), unthreaded ground spike (not shown), or weighted base plate (not shown). A permanent magnet (208) may be attached to coupling mechanism and disposed inside a coil (210) of conductive wire wound around a reaction mass (201). The reaction mass (201) may be connected to the sensor casing (202) by at least one spring (214) such that the coil (210) and reaction mass (201) may oscillate with respect to the permanent magnet (208) in response to an applied vibration. The oscillation may induce a voltage in the conductive wire of the coil. The induced voltage may be digitized using an analog to digital converter (ADC) (206) and the resulting time series stored within the geophone in a microprocessor and memory module (207). As an alternative, or in addition, the time series may be transmitted to a remote receiver using a telecommunications transceiver (not shown) or electrical communication cables (not shown).

A seismic receiver may also contain ancillary components such as a battery (205). In addition, the telecommunications transceiver may send and receive diagnostic information and status indicators.

Figure 3:
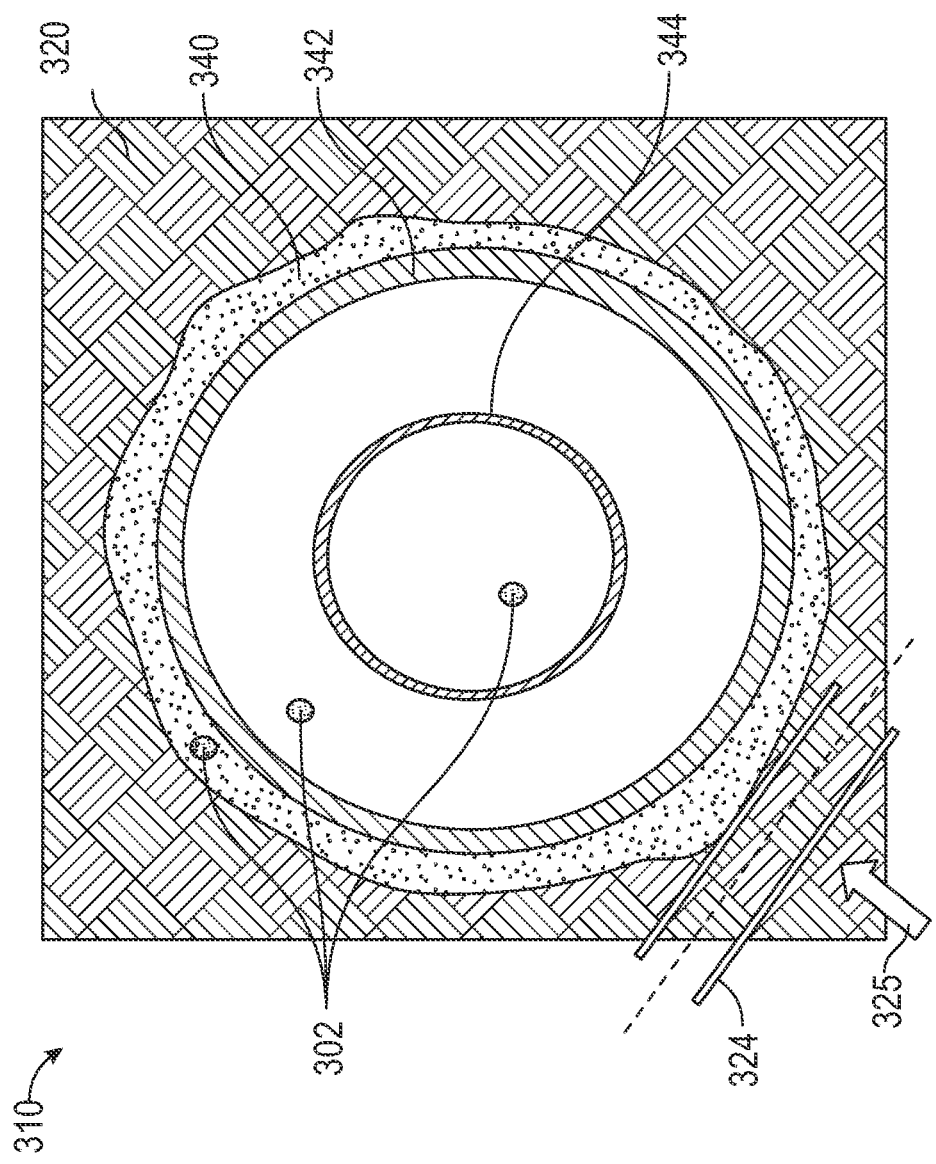
FIG. 3 shows cross-section of a DAS system deployment example in accordance with one or more embodiments.

FIG. 3 shows a cross-section of a borehole (310) penetrating a formation (320), in accordance with one or more embodiments. A plurality of fiber optic cables (302) may be deployed at a plurality of radii and azimuths within the cross-section of a borehole (310). The configuration shown in FIG. 3 may be used to determine the arrival direction (325) of an incident seismic wave (324). For example, a fiber optic cable (302) positioned on a first side of the borehole (310) may sense the incident seismic wave (324) at an earlier time than a fiber optic cable (302) located on the opposite side of the borehole (310) if the first side of the borehole (310) is closer to the arriving seismic wave (324). Similarly, a first fiber optic cable (302) located close to the circumference of the borehole (310) may sense an incident seismic wave (324) earlier than a second fiber optic cable (302) located close to the axis of the borehole (310) if the first fiber optic cable (302) is located in the direction of arrival of the seismic wave (325).

Rather than deploying multiple fiber optic cables (302) within the cross-section of the borehole (310), similar arrival direction detection functionality may be achieved by coiling one fiber optic cable (302) around the circumference of the borehole, or around a structure within the borehole (310), such as the casing (342), or the production tubing (344), in a helical manner. Although a helix may only pass through a cross-section of the borehole (310) at a single point, it may occupy a plurality of different positions within the cross-section of the borehole (310) within a short axial distance. Thus, to a high level of approximation it may produce a measurement equivalent to that produced by the fiber optic cable (302) at a plurality of locations within the cross-section of a borehole (310)

The small diameter of the fiber optic cable (302), e.g., ¼ inch (0.635 cm) or less, allows for deployment of the fiber optic cable (302) at locations that have traditionally been hard to access. For example, in addition to deploying the fiber optic cable (302) inside the production tubing (344), it may also be deployed in the annulus between the production tubing (344) and the casing (342), cemented permanently outside the casing (342) in cement (340), or temporarily positioned inside the cement (340), e.g., temporarily disposed within a capillary tube embedded in the cement.

Disposing the fiber optic cable (302) in the cement (340) outside the casing (342) may eliminate the need to either shut-in the well and/or remove the production tubing (344) before conducting a sonic survey. Further, the fiber optic cable (302) that forms the downhole component for a DAS system (400) is relatively inexpensive and, due to its non-toxic nature, may be abandoned or left inactive in the borehole (310) after use. Thus, the disposable nature of the optical fiber makes it feasible to deploy the fiber optic cable (302) outside casing and within the cement (340).

Figure 4:
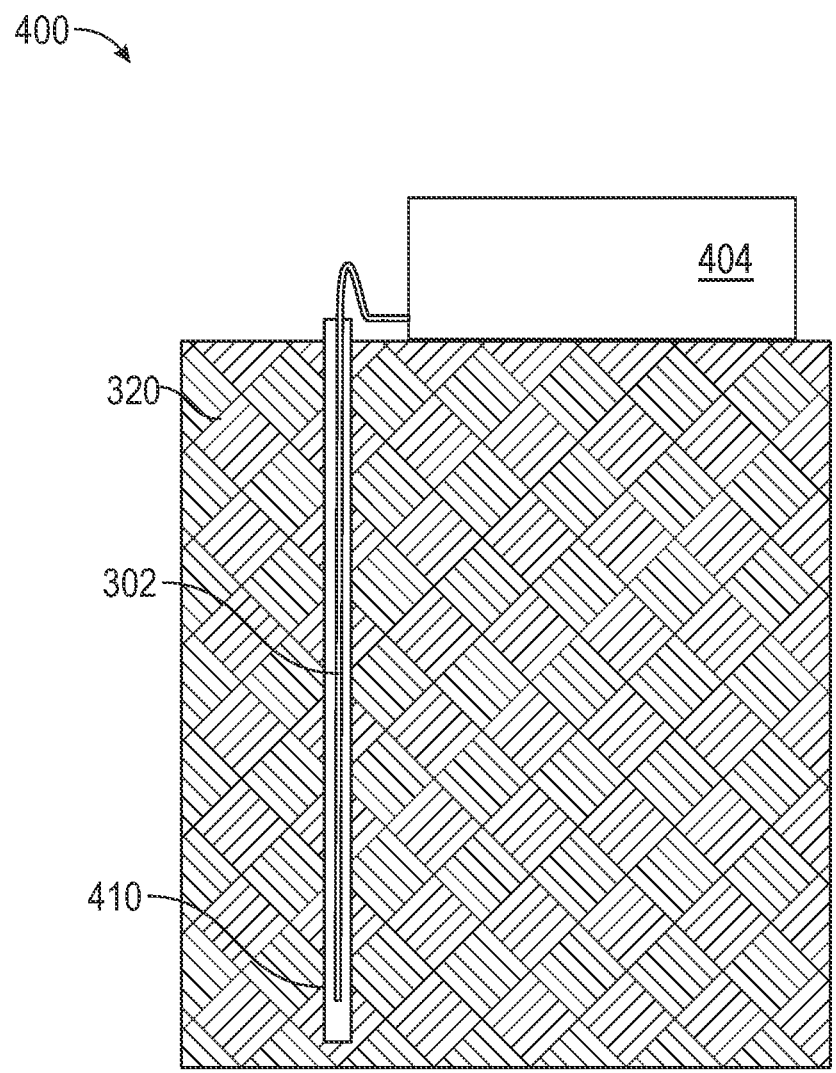
FIG. 4 shows longitudinal section of a DAS system deployment example in accordance with one or more embodiments.

FIG. 4 shows an example of a DAS system (400) deployed in accordance with one or more embodiments. An optical pulse launcher, optical interrogator and data acquisition system (404) may be deployed on the surface attached to a fiber optic cable (302) deployed in a borehole (410) into a subsurface formation (320). An optical pulse launcher (404) connected to the end of the fiber optic cable (302) uses a laser to send pulses of light along the fiber. At each interval along the fiber optic cable (302) some proportion of the light travelling is reflected from heterogeneities within the fiber optic cable (302) by the process of Rayleigh scattering. The reflected light may be caused to interfere with another other proportion of the laser light that has traversed a reference coil of fiber optic cable (302) within the optical interrogator (404). The interference pattern caused by the interference is observed by a DAS interrogator and is recorded by the data acquisition system (404). The interference pattern may be observed to change when a portion of the fiber optic cable (302) is strained or distorted, for example, by a seismic wave impinging upon the fiber optic cable (302). The optical pulse launcher and optical interrogator (404) may record the strain of a plurality of portions of the fiber optic cable (302) simultaneously. Typically, within the DAS system (400) each of the plurality of interrogated portions of the fiber optic cable (302) has the same length known as the "gauge length". The gauge length may typically lie in the range 6-60 ft (2-20 m).

In some embodiments, the DAS system (400) may be augmented with one or more discrete seismic receivers (200) located at points along the length of the borehole (410). In some embodiments, the discrete seismic receivers (200) may be deployed on a separate dedicated cable. In other embodiments, the discrete seismic receivers (200) may be integrated into the DAS system (400) and transmit the data they record through the fiber optic cable (302). In accordance with one or more embodiments a plurality of discrete seismic receivers (200) may be located at regular or irregular intervals along the length of the borehole (410). The fiber optic cable (302) and the discrete seismic receivers (200) may be configured so that they may all communicate data to the data acquisition system (404).

The discrete seismic receivers may be hydrophones (which measure pressure fluctuations), geophones (which measure particle velocity), accelerometers (which measure particle acceleration), or discrete optical sensors. Hydrophones may use piezoelectric materials or magnetostrictive materials that emit an electrical signal in response to an applied pressure. Geophones typically comprise a spring-mounted wire coil moving within the field of a permanent magnet. Accelerometers may also be based on a spring-mounted moving coil design or may piezo-restrictive or piezo-capacitive designs. Discrete optical sensors may utilize fiber Bragg gratings, or may utilize a Fabry-Péyrot interferometry principle.

Figure 5:
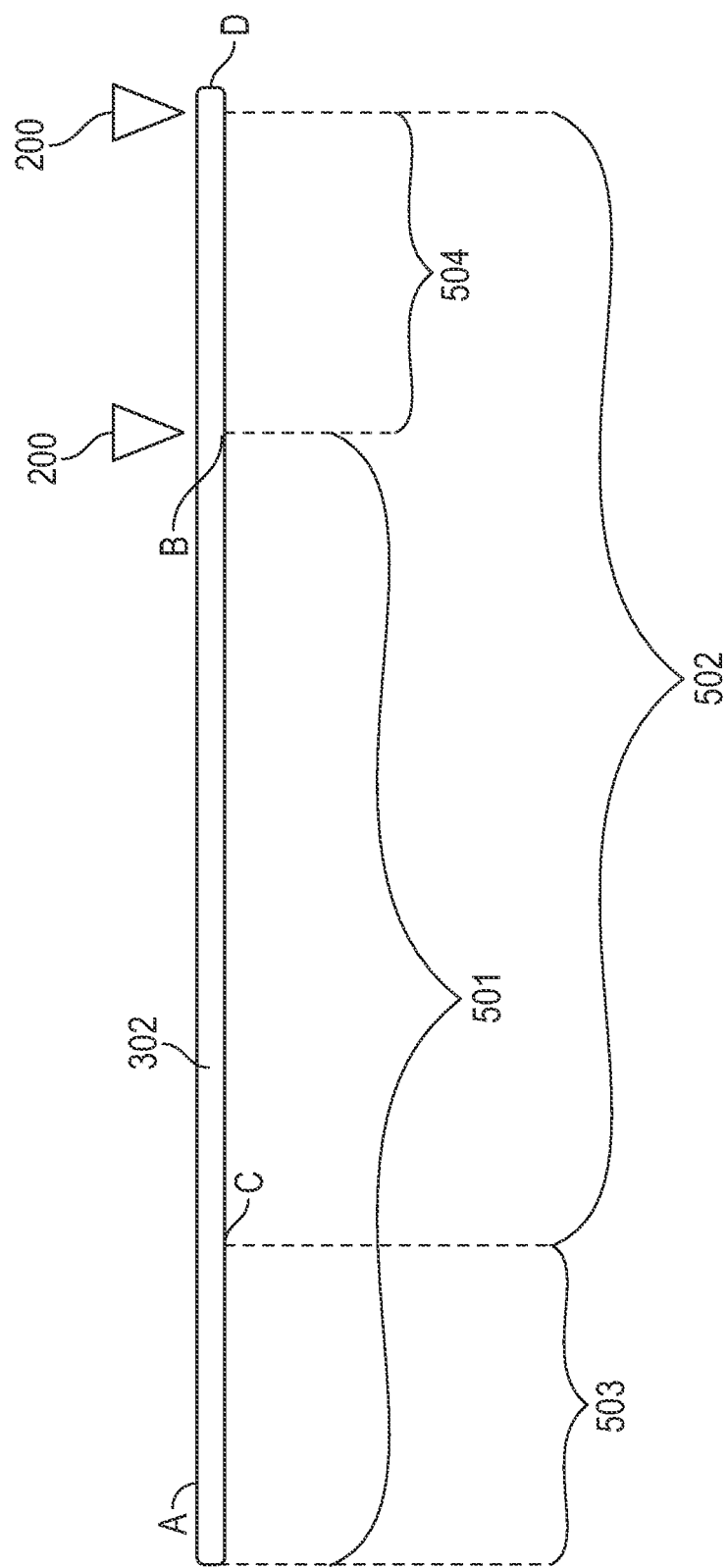
FIG. 5 shows a measurement method example in accordance with one or more embodiments.

FIG. 5 shows an example for determining a sub-gauge DAS measurement, i.e., DAS gauge 3 (503), in accordance with one or more embodiments, wherein the DAS gauge 3 (503) length is shorter than gauge length applied in the DAS. Specifically, as shown in FIG. 5, a plurality of discrete seismic receivers (e.g., geophones) (510) and a fiber optic DAS cable (520) are deployed in a wellbore. For example, the discrete seismic receivers (510) may be deployed outside the casing in the cement filling the annulus between the casing and the borehole wall, alternatively the discrete seismic sensors (200) may be clamped to the interior surface of the casing. Alternatively, the discrete seismic receivers (510) may be inside the well casing, e.g., conveyed by wireline. In some embodiments, the discrete seismic receivers (510) and the DAS cable (520) may employ the fiber optic cable (302) and one or more the discrete seismic sensor (200) such as those shown in FIG. 4.

Further, FIG. 5 shows the gauge geometry of a plurality of DAS measurements, including DAS gauge 1 (501) between locations A and B, and DAS gauge 2 (502) between locations C and D. In particular, a first distance between locations the A and B may be equal to a second distance between the locations C and D. Moreover, a third distance between the locations A and C may be less than the first of distance. Each DAS measurements obtained over a gauge, such as the gauges indicated are obtained using an optical launcher and optical interrogator (404) interrogating a fiber optic cable (302). Such a DAS measurement may be determined by the average strain of the fiber optic cable (302) over the gauge length.

Furthermore, measurements from discrete seismic receivers (200) at locations B and D may be acquired. The plurality of discrete seismic receivers may be deployed with a spacing that equals a gauge length of the DAS system (400). The measurements recorded by the discrete seismic receivers (200) at different locations and the measurements recorded by the DAS system (400) may record a seismic wave generated by the same seismic source, and are preferably recorded at the same time. Mathematical transformations may be applied to the measurements of the discrete seismic receivers (200) at the locations B and D (geophone_B and geophone_D, respectively) in order to transform the discrete seismic receiver measurements to a measurement equivalent to a DAS system measurement, with a gauge extending from geophone B to geophone D, i.e., gauge 4 (504). The DAS equivalent measurement may be calculated as:

$$DAS\ gauge\ 4 = Geophone\_B - Geophone\_D \quad \text{Equation (1)}$$

Similarly, the sub-gauge DAS measurement, i.e., DAS gauge 3 (503), may be calculated based on the DAS measurements and the DAS equivalent measurement:

$$DAS\ gauge3 = DAS\ gauge1 + DAS\ gauge4 - DAS\ gauge2 \quad \text{Equation (2)}$$

Figure 6:
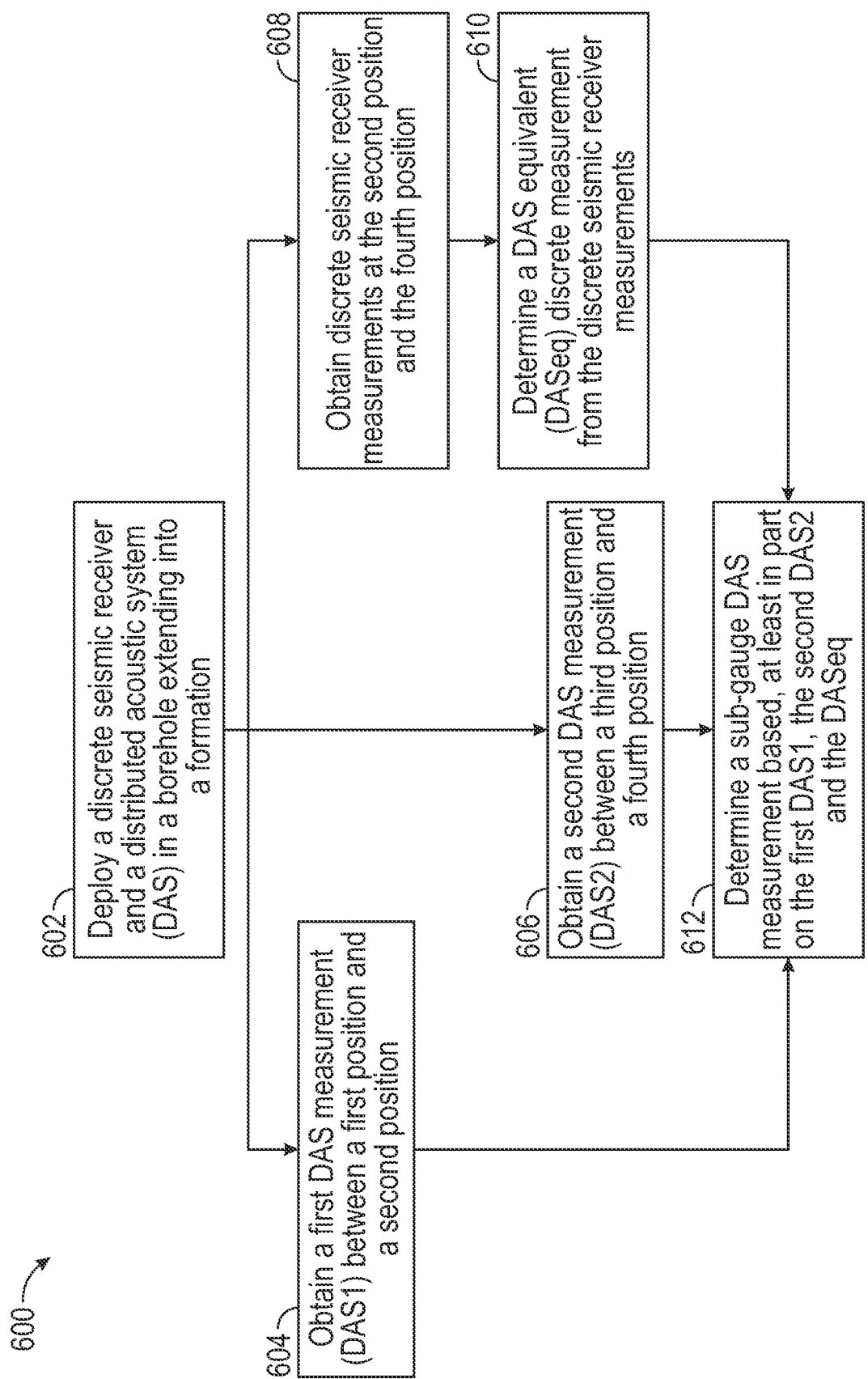
FIG. 6 shows a flowchart in accordance with one or more embodiments.

FIG. 6 shows a flowchart (600) in accordance with one or more embodiments. In Block 602, a plurality of discrete seismic receivers and a DAS are deployed in a borehole extending into a formation. In some embodiments, the deployment may be the deployment described in FIGS. 4 and 5.

In Block 604, a first DAS measurement (DAS1) between a first position and a second position is obtained. In some embodiments, the DAS1 may refer to the DAS gauge 1 (501) as shown in FIG. 5.

In Block 606, a second DAS measurement (DAS2) between a third position and a fourth position is obtained. In some embodiments, the DAS2 may refer to the DAS gauge 2 (502) in FIG. 5.

In Block 608, discrete seismic receiver measurements at the second position and the fourth position are obtained. In Block 610, an DAS equivalent ($DAS_{eq}$) discrete measurement from the discrete seismic receiver measurements from Block 608 is obtained. In some embodiments, the $DAS_{eq}$ is obtained in accordance with equation (1), based on the discrete seismic receiver measurements at the second and fourth positions. In some embodiments, the $DAS_{eq}$ may refer to the DAS gauge 4 (504) in FIG. 5.

In block 612, a sub-gauge DAS measurement between the first and third locations ($DAS_{sg}$) may be determined based, at least in part, on the first DAS1, the second DAS2, and the $DAS_{eq}$ in accordance with equation (2). The sub-gauge DAS represents a DAS measurement with a shorter gauge length than the original DAS measurement.

The spatial resolution of DAS measurements, and of formation properties derived from them, may be limited by the gauge length over which they are made. In some cases, it may be desirable to have higher spatial resolution DAS measurements.

For example, DAS measurements may be used to determine mechanical characteristics of the formation surrounding the borehole. In particular, mechanical characteristics such as material density, propagation velocity and propagation velocity anisotropy of elastic waves may be determined. In turn, these velocities may be used to infer the presence and intensity of microfractures and variations of geomechanical stresses as a function of distance along and perpendicular to a borehole axis. The presence of microfractures is frequently correlated with the presence of high permeability zones and a knowledge of their distribution is one factor in determining a well completion plan. For example, zones with low intensity of microfracturing may require hydraulic fracturing to supplement the natural permeability of the formation. In contrast, zones with high intensity of microfracturing may be prone to the production of sand grains that may damage pumps and other production equipment. Such zones may require installation of screens to filter out sand grains from hydrocarbon production flow.

Conventional DAS measurements may provide formation characteristics at a coarse spatial scale that may be inadequate for optimal well completion planning particularly in formations where rocks are finely layered. In some embodiments, a sub-gauge DAS measurement may allow stimulation operations, including hydraulic fracturing and acidization, and the installation of completions to be performed with greater precision and lower risk.

A completion design system may be used to design the well completion plan at least partially based on the sub-gauge mechanical characteristic and petrophysical characteristic of the formation. The well completion plan may include a casing and production tubing plan specifying which portions of the well are to be cased and with which grade (wall thickness) of casing and whether to deploy production tubing and to what depth. In addition, the well completion plan may specify a plurality of locations at which to perforate the casing to establish hydraulic communication between the well and the formation. Further, the well completion plan may determine the hydraulic fracturing plan, including how many stages into which to divide the hydraulic fracturing, the fracture fluid pump rates and durations, and the quantities and grades of proppant to pump into the hydraulic fractures to prevent closure. Still further, the well completion plan may include the number and position of electrical submersible pumps with which to pump fluids from the toe of the well to the well head.

Figure 7:
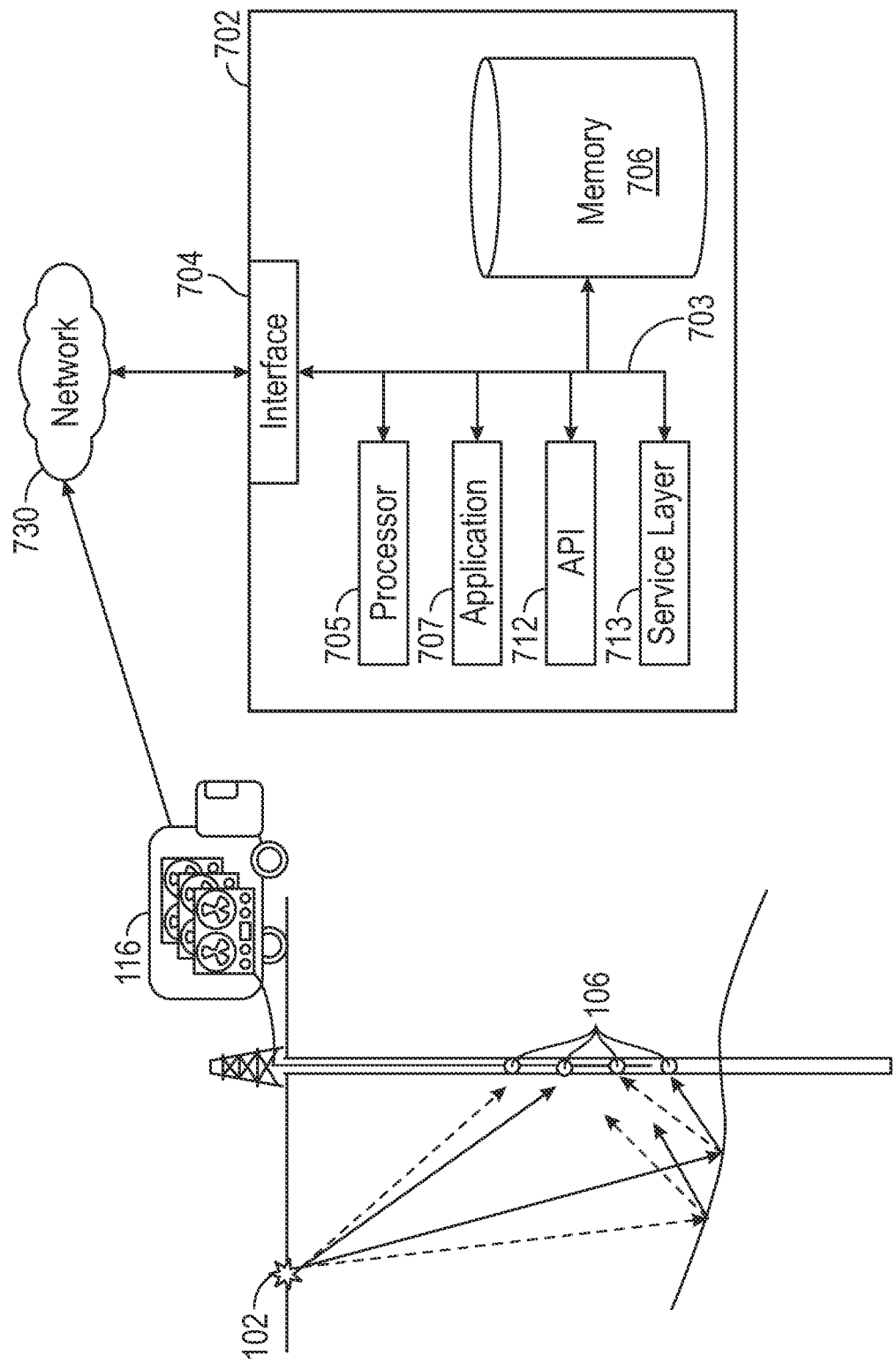
FIG. 7 shows a system in accordance with one or more embodiments.

FIG. 7 shows a system in accordance with one or more embodiments. The system may include a seismic source (102), and a plurality of multicomponent borehole seismic receivers (106) for detecting a seismic wave generated by the seismic source. The system may further include a seismic recording facility (116) for recording the detected seismic waves and a seismic processor that may be located in the seismic recording facility or may be located at a location remote from the wellbore and connected to the seismic recording facility by a network (730). The seismic processor may be a computer system configured to process a VSP dataset to determine a shear-wave attenuated vertical component VSP dataset. Moreover, the system may include the completion design system, which further includes a computer processor and computer readable memory. The computer system of the completion design system may be communicably connected to the seismic processor. In some embodiments, the seismic processor and the processor in the completion design system may refer to processor (705) described below.

FIG. 7 further depicts a block diagram of the computer system (702) used to provide computational functionalities associated with described algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a Graphical User Interface (GUI).

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, executing on another computer (702)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
    deploying a plurality of discrete seismic receivers and a distributed acoustic system (DAS) in a borehole extending into a formation;
    obtaining a first DAS measurement (DAS1) between a first position and a second position;
    obtaining a second DAS measurement (DAS2) between a third position and a fourth position;
    obtaining a discrete seismic receiver measurement between the second position and the fourth position;
    determining an DAS equivalent discrete measurement (DASeq) from the discrete seismic receiver measurement;
    determining a sub-gauge DAS measurement (DASsg) based, at least in part, on the first DAS measurement, the second DAS measurement and the DAS equivalent discrete measurement; and
    determining mechanical characteristics of the formation based, at least in part, on the sub-gauge DAS measurement.

2. The method of claim 1, further comprising planning and deploying a well completion in the borehole based, at least in part, on the mechanical characteristics of the formation.

3. The method of claim 1, wherein the sub-gauge DAS measurement is calculated by $DAS_{sg}=DAS1+DAS_{eq}-DAS2$.

4. The method of claim 1, wherein a first distance between the first and second positions equals a second distance between the third and fourth positions.

5. The method of claim 4, wherein a third distance between the first and the third positions is less than the first distance.

6. The method of claim 5, wherein the first distance lies in a range of 2-20 meters.

7. The method of claim 6, wherein the third distance is less than 5 meters.

8. The method of claim 1, wherein the plurality of discrete seismic receivers are deployed with a spacing that equals a gauge length of the DAS system.

9. The method of claim 2, wherein the plurality of discrete seismic receivers is disposed outside a casing.

10. The method of claim 1, wherein each discrete seismic receiver comprises a geophone, an accelerometer, or a hydrophone.

11. A system, comprising:
    a plurality of discrete seismic receivers and a distributed acoustic system (DAS) deployed in a borehole extending into a formation; and
    a seismic processor configured to:
        obtain a first DAS measurement (DAS1) between a first position and a second position;
        obtain a second DAS measurement (DAS2) between a third position and a fourth position;
        obtain a discrete seismic receiver measurement between the second position and the fourth position;
        determine an DAS equivalent discrete measurement ($DAS_{eq}$) from the discrete seismic receiver measurement;
        determine a sub-gauge DAS measurement ($DAS_{sg}$) based, at least in part, on the first DAS measurement, the second DAS measurement and the DAS equivalent discrete measurement; and
        determine mechanical characteristics of the formation based, at least in part, on the sub-gauge DAS measurement.

12. The system of claim 11, further comprising a completion design system configured to plan a well completion in the borehole based, at least in part, on the mechanical characteristics of the formation.

13. The system of claim 11, wherein the sub-gauge DAS measurement is calculated by $DAS_{sg}=DAS1+DAS_{eq}-DAS2$.

14. The system of claim 11, wherein a first distance between the first and second positions equals a second distance between the third and fourth positions.

15. The system of claim 14, wherein a third distance between the first and the third positions is less than the first distance.

16. The system of claim 15, wherein the first distance lies in a range of 2-20 meters.

17. The system of claim 16, wherein the third distance is less than 5 meters.

18. The system of claim 11, wherein the plurality of discrete seismic receivers are deployed with a spacing that equals a gauge length of the DAS system.

19. The system of claim 11, wherein the plurality of discrete seismic receivers is permanently disposed outside a casing.

20. The system of claim 11, wherein each discrete seismic receiver comprises a geophone, an accelerometer, or a hydrophone.

* * * * *